Nov. 29, 1932.                G. HORNER                 1,889,660
                      ENGRAVING AND OTHER MACHINE
                    Filed Feb. 16, 1928      4 Sheets-Sheet 1

Nov. 29, 1932.     G. HORNER     1,889,660
ENGRAVING AND OTHER MACHINE
Filed Feb. 16, 1928     4 Sheets-Sheet 3

Inventor
George Horner
By
Hubert Pick  Attorney

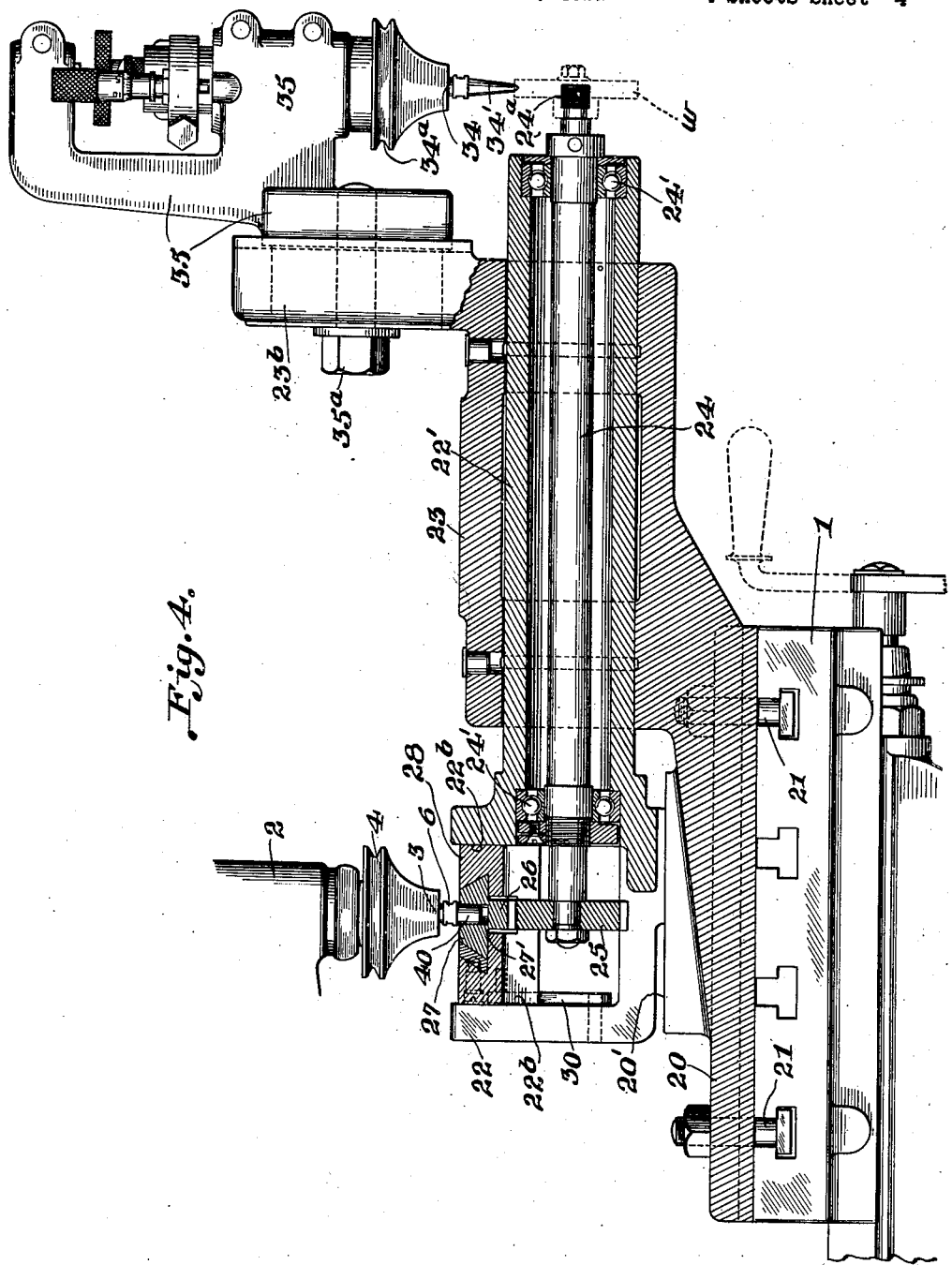

Patented Nov. 29, 1932

1,889,660

UNITED STATES PATENT OFFICE

GEORGE HORNER, OF RACINE, WISCONSIN, ASSIGNOR TO GEORGE GORTON MACHINE COMPANY, OF RACINE, WISCONSIN, A CORPORATION OF WISCONSIN

ENGRAVING AND OTHER MACHINE

Application filed February 16, 1928. Serial No. 254,741.

This invention relates to engraving machines, and this term is herein employed in a generic sense to include routing, milling, die sinking and other machines or wherein the engraving or other cutting operation on the work is controlled by or is a scaled reproduction of so-called copy or a pattern through the medium of a tracing stylus and pantograph or equivalent mechanism; and the objects and nature of the invention will be readily understood by those skilled in the art in the light of the following explanations of the accompanying drawings that illustrate what I now believe to be the preferred mechanical expression or embodiment of the invention from among other formations, combinations, constructions or arrangements, within the spirit and scope thereof.

It is an object of the invention to provide means and/or mechanism for the simplification of and expediting the engraving machine operation of reproducing designs or characters on and wholly or partially around the circumference, edge or periphery of the work, such as annular or disk-like articles or parts.

A further object of the invention is to provide an engraving machine, with mechanism to operatively connect the tracing stylus and the work, in such manner as to, in scaled relation, automatically shift the work laterally and rotate the same in operative relation to a relatively stationarily mounted rotating cutting tool, by the movements of the tracing stylus in following straight line copy or copy in a single plane.

With the foregoing and other objects in view, my invention consists in certain novel features, arrangements and/or combinations as hereinafter more fully described and specified.

Referring to the accompanying drawings, forming a part hereof:

Fig. 4 shows the attachment of my invention in part in side elevation and in part in vertical longitudinal section, the driving belt not being shown, the engraving machine cutter head and work table being shown in part from the opposite side of the machine from that shown by Fig. 1.

Figure 1:
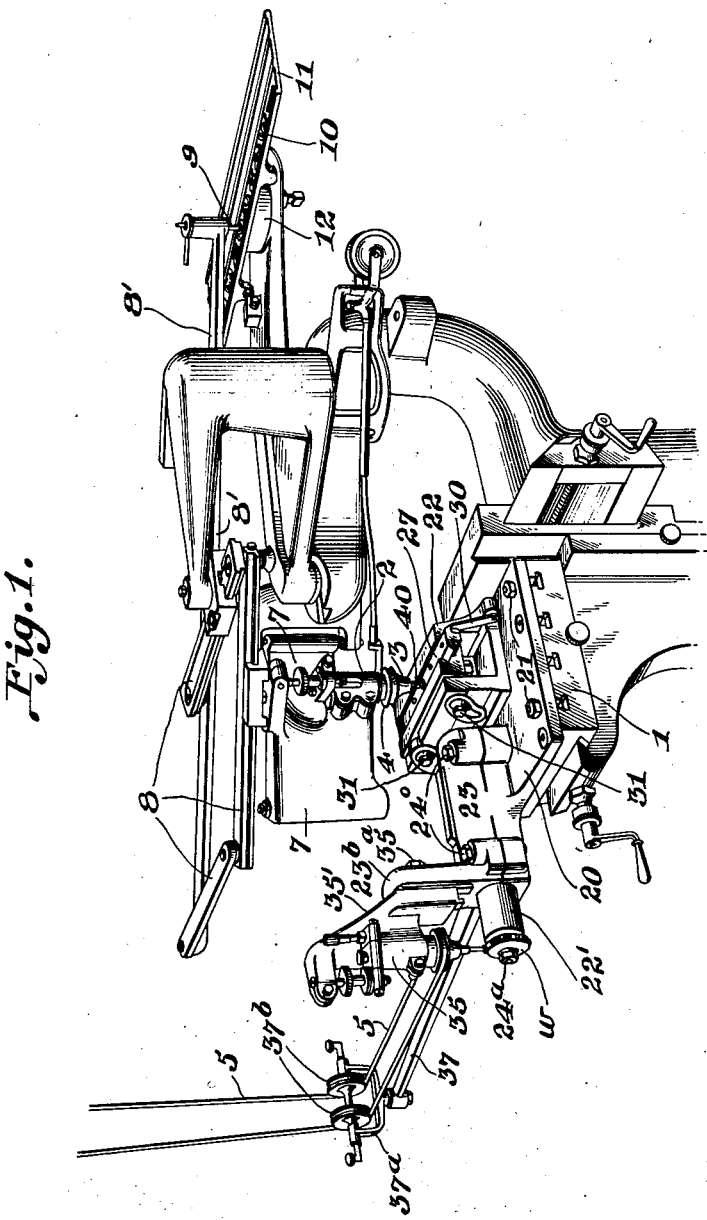
Fig. 1 is a more or less diagrammatical perspective, partially broken away, showing a flat surface engraving machine equipped in accordance with my invention for engraving on the rim of a disk.
Figure 2:
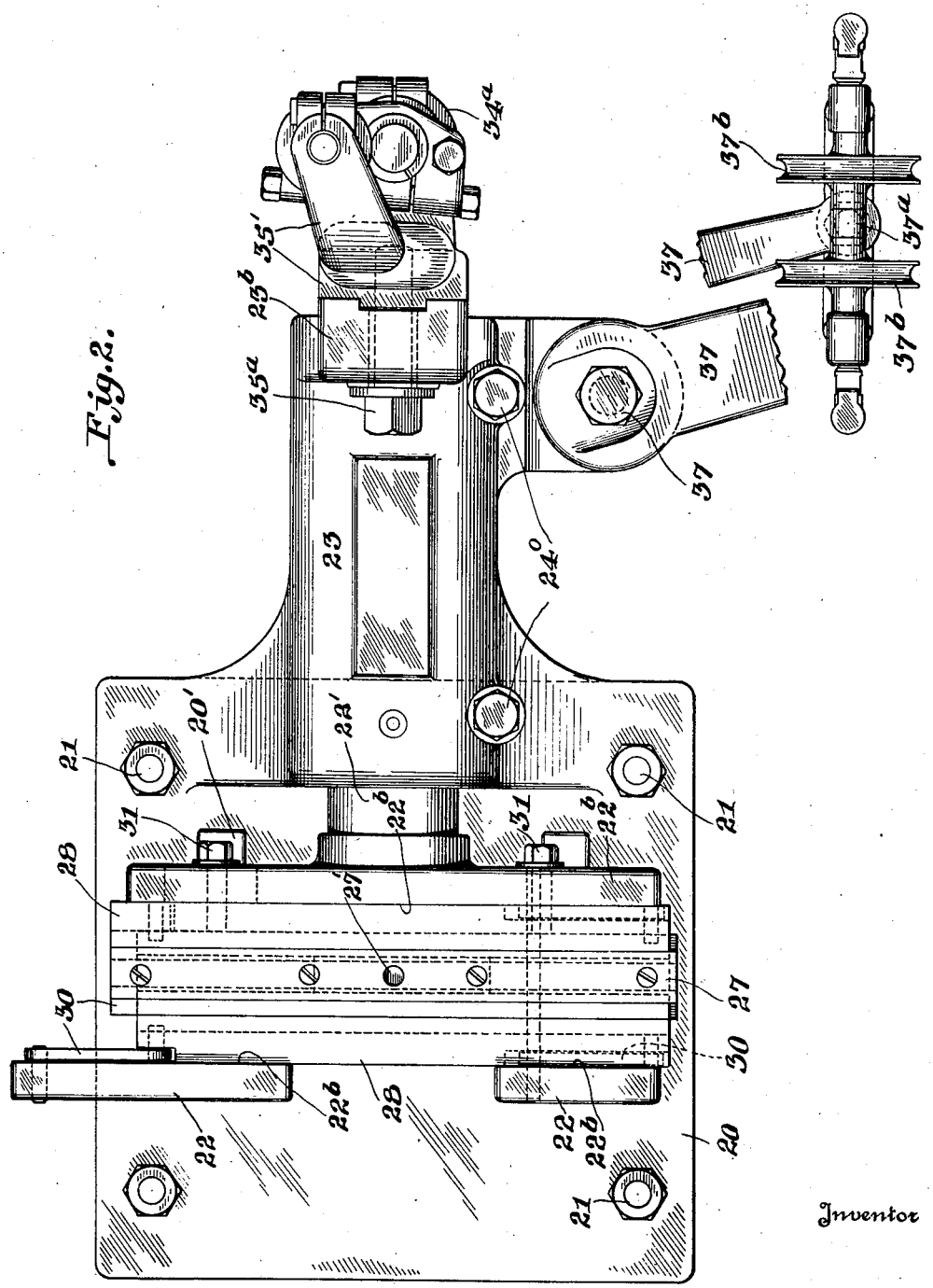
Fig. 2 shows in top plan an engraving machine attachment in accordance with my invention, partially broken away.
Figure 3:
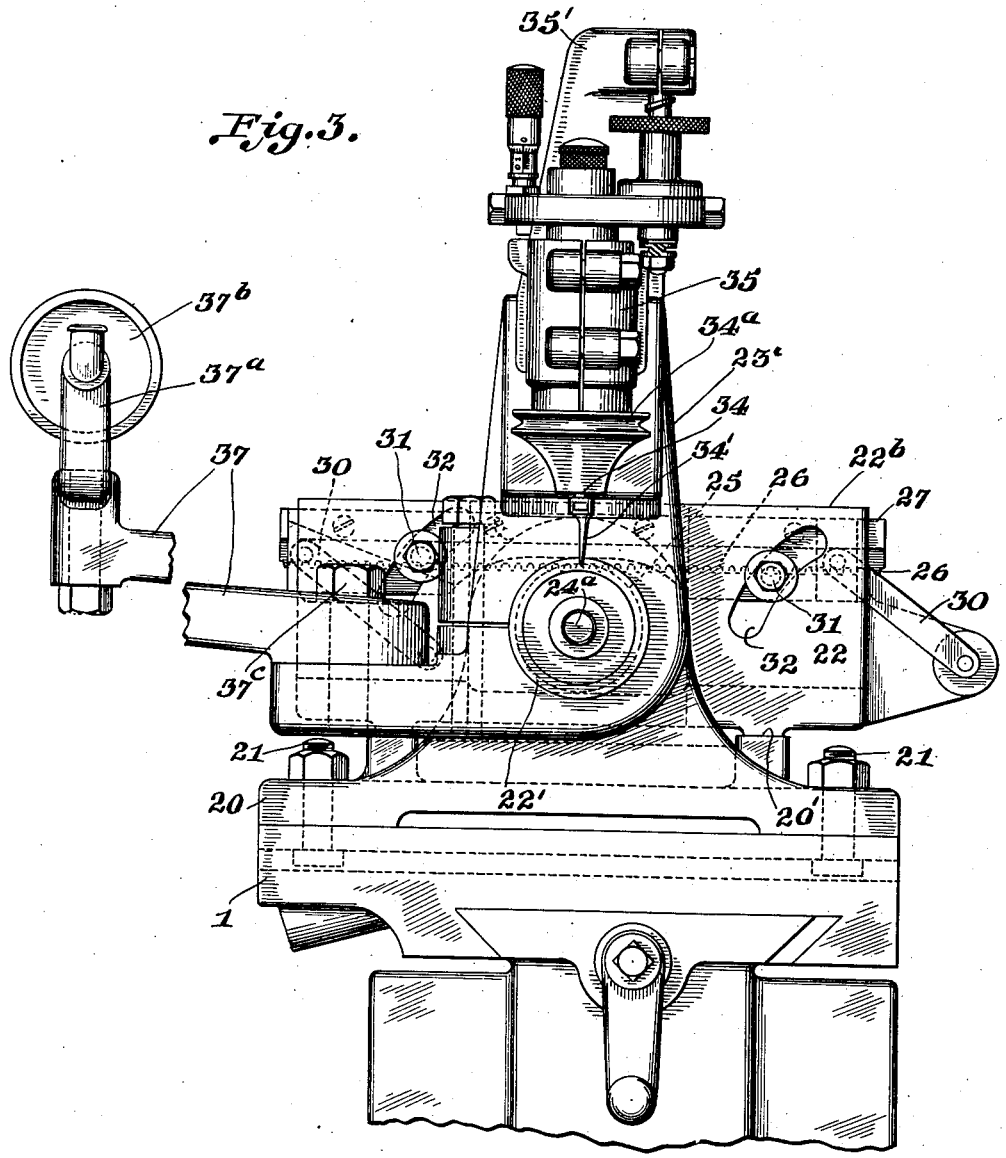
Fig. 3 is a front end elevation of the attachment of Fig. 2, shown applied to an engraving machine work table, the driving belt not being shown, the idler pulley supporting arm being partially broken away.

In the drawings, I more or less diagrammatically indicate any conventional or other form of engraving machine of the pantograph type, designed for working or engraving on a flat surface or what is usually termed a plane surface. The engraving machine shown, embodies a work table 1, located under the cutter head 2, that carries the vertical rotary cutter spindle 3, having belt pulley 4, by which the spindle is driven through the medium of endless driving belt 5, from any suitable source of power. The lower end of the cutter spindle is equipped with any suitable chuck 6, to removably receive the rotary cutting or so-called engraving tool to operate on the work clamped on the table 1. As usual or in any other suitable manner, the cutter head 2, is supported to move laterally or in a horizontal plane, while the rotary cutter spindle is driven and maintained in its vertical position, while operating on the work on the table. In the particular example illustrated, the cutter head is mounted for universal movement in one plane during operation, by the jointed supporting links 7, carried by the main frame.

The cutter head is moved laterally or horizontally over the work, during operation by any suitable pantograph mechanism 8, or equivalent adjustable or scaling means, carried by the main frame, and coupled to the cutter head, and actuated by hand or otherwise, in the usual or any other desirable manner. In the example illustrated, the arm 8', of the pantograph carries the tracing stylus 9, and is adapted to be grasped by the hand in manipulating the pantograph to cause the stylus to follow the pattern or copy 10, and thereby correspondingly move the cutter head, according to the reproducing scale for which the pantograph has been set, to reproduce the copy on the work. The copy 10, is usually arranged in flat or horizontal form in or on a suitable copy holder 11, stationarily secured during operation to the copy holder support or table 12, fixed to the main frame. The copy 10, is stationarily held during operation in such position that the stylus is freely movable thereover.

It is a more or less slow and somewhat difficult operation to prepare a plane or flat surface engraving machine for engraving on and around curved surfaces, such as on the rim or periphery of a lens mount, numeral wheel, and the like, and then the indexing and engraving operation is slow and requires more or less skilled or expert attention and operation. So far as I am now aware, it has heretofore been the practice to adapt flat surface engraving machines, for the performance of work such as just described, by employing a rotary copy dial having index points or notches arranged in annular series around its periphery and with the copy to be reproduced arranged in a circle or annular series corresponding to the index points. Also by employing a work holder attachment, secured on the (machine) work table, that embodies a horizontal rotary spindle to which the work is clamped, and that is provided with an index disk having an annular series of edge index notches corresponding to the annular series of areas around the rim of the work on which the copy is to be reproduced by the rotary cutting tool of the engraving machine cutter head. The work holder attachment was secured to the machine work table to bring the uppermost area of the rim of the work under the rotary cutting tool. The rotary work holder and the rotary copy dial both required indexing means or locks, and necessitated manual indexing or rotation of the copy dial from notch to notch as the engraving work progressed and corresponding manual rotation of the work holding spindle from notch to notch, by a separate operation. This practice, did not produce engraving on the rims of such work, of uniform depth throughout, because of the curved surface of the work and the fact that the rotary cutting tool does not move vertically during its cutting operation, in a simple flat surface engraving machine.

If it was necessary to provide engraving work around the rim of a wheel or the like, with the engraving cuts of uniform depth throughout, it became necessary to apply the work indexing attachment and the indexing rotary copy dial to a relatively expensive engraving machine having a forming guide to control the depth of the cut by the curvature of the work, for instance such as disclosed by my Patent No. 1,562,237, Nov. 17, 1925.

I have solved this problem of adapting or converting a flat surface engraving machine, for the economical reproduction of copy on the rim of circular work and the like, by providing mechanism that enables me to employ straight line or flat copy, which is easily and economically prepared, and that enables me to dispense with the separate manual copy and work indexing operations, by operatively connecting the pantograph with the work holder in such manner that the work is automatically shifted by the movements of the tracing stylus in following the flat copy through the medium of the pantograph and parts operated thereby, to shift and rotate the work in presenting the curved surface thereof to the engraving or cutting action of a rotating driven cutting tool that is stationarily mounted and held against longitudinal movement during the engraving operation. In other words, I am enabled to employ a flat or straight line copy, for this peculiar work, by providing means that enables me to employ the stylus and pantograph to automatically shift and feed the work with respect to the rotary cutting tool stationarily mounted, instead of shifting the cutter over the work and manually feeding or indexing the work, as heretofore.

In the particular example illustrated, I provide an attachment for a flat surface engraving machine, which when assembled with the machine, provides means whereby the machine is capable of accomplishing the result just described. This attachment is carried by a supporting frame that embodies a bottom base 20, to removably rest on the top surface of the engraving machine work table 1, which in this instance is flat and horizontal and parallel with the plane in which the rotary engraving cutter of spindle 3, is movable during an engraving operation. The attachment base 20, is during operation, fixedly, yet removably, secured on the work table 1, in any suitable manner, as by clamping bolts 21.

The base 20, of the attachment, provides a top longitudinally arranged slide, and guideway, for a longitudinally movable work holder carriage 22. In the example shown, this slideway, is formed by an elevated longitudinally arranged and projecting tubular housing or sleeve 23, integral with the base 20, longitudinally split and provided with tightening bolts 24°, for increasing or decreasing the internal diameter of the sleeve to take up wear or to attain the desired sliding fit between the inner surfaces of the sleeve and the portion of said carriage located within the sleeve.

The work holder carriage 22, is exposed over the base 20, to the rear of the guide sleeve 23, and is formed with a rigid horizontal forwardly projecting slide stud 22′, extending through and freely longitudinally slidable within the sleeve. To the rear of the sleeve 23, the bottom of the carriage engages and is slidable on top slide surface 20′, of the base 20, to hold the carriage in a horizontal position parallel with the plane of the work table and against rotating or oscillating on the stud 22′, as an axis, although I do not wish to so limit my invention, as the carriage and slideway provided by the base can be formed other than circular or cylindrical in cross section to hold the carriage to straight line reciprocation in a plane parallel with the work table.

In the example shown, the carriage 22, holds and carries the work $w$, the circular rim or edge of which is to be engraved, through the medium of a rotary shaft or spindle 24, the projecting front end of which is formed and equipped to removably receive and hold the work in relatively fixed position with respect to the shaft and in the required relation to the rotary cutting tool that is to perform the engraving operation on the rim or circumference of the work. This spindle 24, extends longitudinally through the carriage and its stud 22′, and is mounted therein in suitable bearings, such as 24′, against end thrust and to freely rotate, so that the longitudinal axis of the spindle is maintained parallel with the plane of the machine work table and accurately perpendicular to the longitudinal axis of the rotary cutter that is to perform the engraving operation. The front end of this spindle projects forwardly from the front end of stud 22′, and provides or makes provision for a chuck or holder through and by which the work is fixedly, yet removably, held to the spindle with the work in a vertical plane and the top or highest portion of the circular usually cylindrical rim of the work directly beneath the vertical rotary cutter in such manner that the horizontal plane tangential to said uppermost portion of the rim of the work will be perpendicular or at right angles to the axis of the rotary cutter. In the example shown, the overhanging front or work holder end 24a of the spindle is shouldered and reduced and screw threaded, to enter the center opening or bore of the work and to receive, if need be, a clamping nut or the like, in such manner, that the circular or cylindrical rim to be engraved will be accurately concentric with the axis of the spindle 24. The work holder spindle 24, projects rearwardly from guide sleeve 23, into the rear transversely elongated portion of the sliding carriage 22, and within said transverse portion of the carriage the rear end of the spindle carries a vertical concentric gear wheel 25, normally rigid with the spindle. A horizontal rack 26, is arranged above and in mesh with the gear 25, and this rack is arranged below, parallel with and fixed to a horizontal elongated slide bar 27, confined to straight line horizontal reciprocation in a vertical plane transversely of and at right angles to the longitudinal axis of the work holder spindle 24. The slide bar 27, is slidably confined in a slideway, usually dovetailed or undercut, in and longitudinally of a holder which in this instance is formed by an elongated horizontal flat plate 28, arranged longitudinally of and in the otherwise open top of the elongated transverse portion of the carriage 22. The floor of the slideway in this plate 28, is longitudinally slotted to receive the rack 26, fixed to slide bar 27, and depending from the plate and slide to constantly mesh with gear 25. The slide 27, is exposed at the top of its holder 28, and at a point between its ends is formed with a vertical cylindrical bearing socket 27′, open at its upper end at the exposed top side of the slide.

The horizontal transversely arranged holder 28, while normally secured in fixed relation to the carriage 22, is adjustable vertically with respect to said carriage, to a higher or a lower horizontal plane, while maintaining a horizontal position, for purposes that will hereinafter appear.

Various means or arrangements, can be provided for thus adjusting the holder 28, while maintaining its horizontal position, although in the particular example illustrated, I show the transverse rear portion of carriage 22, formed with relatively fixed parallel spaced vertical walls 22b, between which the holder 28, is centered in vertical sliding engagement and by which it is maintained in its transverse position with respect to the axis of spindle 24. A parallel ruler arrangement is provided to maintain holder 28, in horizontal position while being elevated or depressed in the carriage and in whatever elevation to which it may be adjusted. For instance, for this purpose, I show several parallel links 30, arranged at opposite end portions of holder 28, and pivotally joined thereto at their upper ends and to the carriage 22, at their lower ends. The holder 28, is normally clamped to the carriage 22, at the desired elevation, by headed clamping screws or bolts 31, extending rearwardly through arcuate slots 32, in the front vertical wall 22b, of the carriage and threaded into tapped sockets in the holder 28. By loosening these screws, the holder is subject to vertical movement and by tightening the screws, the holder is fixedly held with respect to the carriage. The gear 25, is removably clamped or otherwise normally fixed on the rear end of the spindle 24, and the rear wall 22b, is open opposite gear 25, in such manner that the gear and its fastening means are accessible for gear removal and replacement. It is sometimes necessary to replace the gear 25, with another gear of different diameter, having a different number of teeth, and hence the provision for vertical adjustment of the rack 26, to accommodate the gear change.

At its front end above the work holder end 24a, of rotary spindle 24, the attachment is equipped with a vertical rotary cutting tool spindle 34, the axis of which is radially arranged with respect to spindle 24, and in the same vertical plane as the axis of said spindle. This spindle at its lower end is provided with a chuck for removably holding rotary cutting tool 34', and also is provided with a spindle driving pulley 34a, to receive and be driven by any suitable belt drive, such as the endless driving belt 5. This rotary cutting tool spindle is mounted against vertical movement during engraving operations in a suitable head or housing 35, providing a standard or other suitable feed screw and barrel for the spindle, whereby the cutter can be fed to and from the work and set to cut at the desired depth in the work. This head 35, that carries the cutter spindle, is normally held in fixed position with respect to the attachment base and spindle 24, through the medium of supporting bracket 35', normally fixedly clamped to the rigid upstanding post 23b, of the sleeve 23, of the attachment, in such manner that the vertical head 35, overhangs the work when secured on the end 24a, of the work holder rotary spindle 24. The bracket 35', is vertically adjustable on the supporting post 23b, and is normally fixedly clamped thereto by clamping bolt 35a, extending through a vertical slot in the post.

The attachment is also preferably equipped with means to guide the endless belt driving transmission, such as belt drive 5, to the pulley 34a, for rotating the cutter 34'. For instance, I show laterally projecting arm 37, carried by and projecting laterally from the base or frame of the attachment as from the sleeve portion 23, and at its outer end carrying a head 37a, carrying a pair of spaced idle pulleys 37b, for the belt 5. The head 37a, is preferably freely oscillatory with respect to supporting arm 37, on a vertical axis. The arm 37, is preferably laterally adjustable on the vertical clamping bolt 37c, as an axis. The bolt 37c, serves to normally clamp the arm fixedly to the base or frame of the attachment.

To adapt a flat surface engraving machine to engrave on circular or the like surface of work, in accordance with my invention, the work table of the machine is adjusted to the proper position with respect to the machine cutter head, to cooperate with my attachment which is clamped on the work table approximately as shown, with the base arranged longitudinally thereof and projecting forwardly therefrom, and so set and arranged that the work holder carriage will move in a plane parallel with the top face of the machine work table, i. e. in a plane parallel with the plane in which the machine cutter head is movable when operated or moved by the pantograph. The rotary cutter is also removed from the chuck of the machine cutter head rotary spindle, and a cylindrical stud 40, is substituted for the cutter tool and operatively fixed to the spindle. This depending stud secured to and alined with the machine cutter head spindle, is inserted in the cylindrical socket 27', of the slide bar 27, carried by the sliding work holder carriage. The endless cutter spindle driving belt 5, is also removed from the cutter spindle driving pulley 4, and operatively applied in driving relation to the driving pulley 34a, of the rotary cutter spindle 34, of the attachment, and in operative guiding engagement with the idle pulleys 37b, of the attachment. This driving belt is thus rearranged to drive the spindle 34 so that its cutter will perform the engraving operations, while the cutter spindle 3, of the machine cutter head, remains at rest or inactive so far as cutter actuating rotation is concerned. The circular or other work having the annular rim on and around which the copy is to be reproduced in scaled relation by the action of the rotating cutting tool 34', is secured on the end 24a, of the rotary and longitudinally movable spindle 24, in such manner as to present its rim in the required operative relation to the cutting tool 34', when the parts carrying such tool are set to bring the tool into operative cutting position with respect to the uppermost portion of the rim where the engraving operation is to be started.

The copy to be reproduced in scaled relation either sunk or in relief on and around the rim of the work, is arranged and secured in straight line flat form on its copy holder, and the holder is secured on the appropriate part of the engraving machine accessible and in operative relation to the tracing stylus of the pantograph.

The pantograph is adjusted and a gear 25, of the proper ratio with respect to the diameter of the rim of the work is installed in the attachment, as hereinbefore described, all to establish the desired scaled relation between the copy and the reproduction thereof cut in the rim of the work. With the attachment thus combined with the engraving machine, the tracing stylus is operatively connected with the work holder through the medium of the pantograph, the machine cutter head and its spindle 3, and stud 40, the slide 27, the rack 26, the gear 25, the work holder rotary spindle 24, and the work holder slidable carriage. The movement of the stylus in following the copy is transmitted to the work to move the same bodily longitudinally and to rotate the same progressively in one direction as the stylus progresses in one direction from one end of the copy toward the other end thereof, and if need be to rotate the work in either direction if the stylus is so moved in following out a design or letter of the copy before moving to the next design or letter.

This operative scaled movement or power transmission of the stylus to the work embodies means to translate rectilinear movement into rotary movement, namely, in this particular example:—the rotary work holder spindle 24, and the gear and rack connection therefrom to slide 27, and also means to translate movement of the stylus parallel with the copy and transversely of the length or longitudinal axis of the straight line copy, into correspondingly scaled movement of the work in a plane parallel with the plane of the copy and longitudinally of the work. This last mentioned movement is transmitted from the stylus to the work through the pantograph, cutter head and its stud 40, the slide 27, and its holder 28, to the vertical walls 22b, of the work holder carriage to slide said carriage in a straight line longitudinally in either direction in a plane parallel with the plane of the copy, in this instance in a horizontal plane. With my attachment combined with the machine, while the stylus is being moved to trace or follow the copy, the cutter head 2, of the engraving machine is moved by the pantograph the same as it would be if provided with a rotary cutter to operate on work fixed on the work table 1, in other words, the cutter head 2, will be moved by means of the pantograph as when engraving on flat work on table 1.

The machine with my attachment applied, by the copy tracing movements of the stylus, automatically indexes or rotates the work to present new surfaces of the rim of the work to the added stationarily mounted rotary cutter 34', and automatically shifts the work longitudinally or transversely so that the stationarily mounted rotary cutter can work across the width of the rim of the work. Straight line movement of the stylus longitudinally of or along the length of the copy, moves the cutter head 2, in a direction longitudinally of the slide 27, and consequently will move said slide longitudinally and cause rotary movement of the work, without causing sliding movement of the work holder carriage and consequently without moving the work from one vertical plane to another. Straight line movement of the stylus across the width of the copy, transversely of the length thereof, will cause a corresponding scaled transverse movement of the cutter head 2, and the stud 40, will move the work holder slide longitudinally and carry the work from one vertical plane to another.

Composite movements of the stylus as when describing a circle or curved or irregular lines, will cause composite movements of the work made up of simultaneous movements from one vertical plane into another and turning or indexing of the work, as may be necessary in reproducing the copy in scaled relation on the rim of the work.

The cutter 34', during operation, works at a fixed point in a fixed plane, and hence the work must be fed to and across this fixed point to bring about removal of material at the rim of the work to reproduce the copy in the rim. The work holder always maintains a fixed radial distance between said fixed point and the axis of spindle 24, during an engraving operation, and said fixed point intersects a plane that is a tangent of the circumference of the rim of the work, and consequently the cuts around the rim are uniform in depth where the circumference of the rim is concentric with the axis of spindle 24. The cutter only operates at one point and will cut a straight line uniform in depth across the rim (longitudinally thereof) if the work is moved longitudinally from one vertical plane to another without being rotated, and hence the cutter only operates on the material of the rim of the work as that material is brought to said point by rotary or by longitudinal movements of the work, which peculiarity results in engraving work on a curved surface uniform in depth around that surface, as distinguished from the action of a cutter movable in a horizontal plane by the stylus operated pantograph, in engraving on a curved surface.

Where a flat surface or other engraving machine embodies my invention through combination with a removable and applicable attachment, the machine can be easily restored for its normal work on removal of the attachment by restoring the belt drive to operative connection with the pulley 4, of the machine cutter spindle and by substituting a rotary cutter for the stud 40.

I realize that my invention can be embodied in an engraving machine as a permanent part thereof, instead of providing an attachment for combination with an engraving machine, and I also realize that my invention is subject to various modifications and variations without departing from the spirit and scope of my invention as defined by the claims and hence I do not wish to limit myself to the approximate disclosure hereof.

What I claim is:—

1. An engraving machine for operating on curved surfaces, such as on the rims of disk-like work; comprising a work holder rotatable for indexing and movable longitudinally of its axis of rotation; a cutter spindle normally working at a fixed point with respect to the curved surface of work carried by said work holder, the axis of the cutter being radial to the axis of rotation of the work holder to produce cuts in the work uniform in depth; means for stationarily holding plain or flat copy to be reproduced in scaled relation on the curved surface of said work;

a stylus movable over the copy while held perpendicular to the plane of the copy for tracing said copy; a movable work-holder carriage carrying said holder and in which said holder is rotatable; and movement transmission and indexing mechanism operatively connecting said stylus with said work holder and with said carriage to independently rotate said holder in and to move said carriage with said holder.

2. An engraving machine of the pantograph type, comprising a pantograph including its operating means; a rotary cutter to operate at a normally fixed point; a work holder movable in a fixed plane and rotatable through approximately three hundred and sixty degrees for indexing circular work approximately throughout the circle thereof, said holder adapted to hold work of the disk type with its surface to be operated on concentric with the axis of rotation of the holder and with the cutter radial of said work surface to produce therein cuts uniform in depth, said holder being movable in said fixed plane parallel with said axis of rotation; and operating and indexing connections from the pantograph to said holder controlling the position of the holder and work and moving the holder with the pantograph to shift the work in said fixed plane and to rotate and index the work with respect to the cutter, said connections including a carriage in which the work holder is independently rotatable, and a member for moving the carriage longitudinally with respect to the work holder axis, said member being movable independently of the carriage to index the work holder.

3. In an engraving machine of the pantograph type including and having its pantograph provided with and actuated by a vertical stylus movable laterally over horizontal copy and also provided with and actuating a vertical member universally movable in a horizontal plane to correspond in scaled relation to the lateral movements of the stylus in following the copy, in combination with a work holder carriage movable back and forth in a straight line; a work-holder rotatively mounted in and supported and carried by said carriage; and stylus movement transmission mechanism operatively connecting said vertical member with the carriage and work holder to move the carriage and rotate the work holder therein by the movements of the stylus longitudinally of the copy.

4. An engraving machine having a stylus perpendicular to and movable normally in a fixed plane for tracing elongated flat copy, and provided with a cutter spindle for operating a rotary cutter at a normally fixed point, said machine also comprising a pantograph actuated by the copy tracing movements of the stylus, a member laterally movable in one plane and actuated by said pantograph to follow in scaled relation said movements of the stylus following the copy, a work holder rotatable to index the work with respect to said fixed point and in operative relation to said cutter, said holder with the work carried thereby being also movable in a plane parallel with its axis of rotation; and movement transmitting and indexing mechanism for moving and rotating said holder and connected with and operated by said member in following the movements of the stylus in tracing the work, said mechanism including a carriage for and with respect to which said holder is rotatable, said carriage being movable longitudinally of the axis of rotation of the holder, and means carried by said carriage and through the medium of which said member moves the carriage longitudinally, said means being also relatively movable with respect to the carriage and operatively coupled with said holder to index the same by rotating the holder.

5. An attachment for engraving machines of the pantograph type, comprising a support for securing to the engraving machine work table, a normally fixed mounting carried by said support and provided with a rotary cutter spindle adapted to be rotated by the endless belt drive of the engraving machine; and a reciprocatory work holder carriage movably carried by said support and provided with a work holder rotatable in and carried by said carriage on its reciprocatory movements, and also provided with and carrying means for operatively coupling to the engraving machine cutter head for reciprocating the carriage and rotating the holder therein by the lateral movements of the cutter head in following the movements of the engraving machine tracing stylus while tracing the copy.

6. An attachment for an engraving machine of the type having a cutter head moved laterally over the work being engraved by the stylus when tracing flat copy, through the medium of a pantograph, to reproduce the copy on the work in scaled relation, said attachment including a support adapted to be removably fixed to the engraving machine work table; a normally fixedly located cutter spindle for the cutter to operate on the work; a work holder carriage carried by and movable with respect to the support; a work holder spindle carried by and movable with the carriage, said spindle being also rotatable with respect to the carriage to rotate disk-like work fixed to said work holder with respect to said cutter arranged radial of the work; a member carried by the carriage adapted for detachable operative connection with the laterally movable cutter head of the engraving machine to move said carriage as the cutter head moves in directions longitudinally of the work holder axis of rotation, said member being movable with respect to the carriage under the actuation of said machine cutter head when moving in directions transversely of said axis of rotation, and an operative connection from said member to said spindle for rotating the spindle by said movement of said member with respect to the carriage.

7. An attachment for a flat surface engraving machine of the type having a work table, a cutter head, a holder for flat copy, a laterally movable stylus for tracing said copy, and a pantograph actuated by said stylus to universally move said head laterally over the work to reproduce the copy in scaled relation on the work, said attachment including a base for securing on the engraving machine, a rotary cutter spindle, said base provided with an arm having an oscillatory head carrying idle pulleys for a belt drive for said spindle; a movable work holder having carrying means confined to the base; and means for moving and indexing said holder, said last mentioned means adapted for operatively coupling to the laterally movable pantograph controlled cutter head of the engraving machine, for actuation by said movements of said cutter head.

8. An attachment for a flat surface engraving machine of the type having a cutter head moved laterally over the work by a stylus tracing flat copy to reproduce the copy on the flat work in scaled relation; said attachment including supporting means whereby the attachment is operatively secured to and removable from the engraving machine, a normally fixedly located spindle for a cutter; a rotary work holder for disk-like work having its surface to be engraved concentric with the holder axis of rotation and with said cutter radial to said surface; a carriage for said holder and in which the same is rotatable, said carriage with said holder being movable in a direction longitudinally of said axis of rotation; a member carried by and movable with said carriage, said member being movable with respect to said carriage transversely of said axis of rotation; means operatively connecting said member with said work holder to normally hold said holder against rotation and to rotate said holder with respect to the carriage by and in scaled relation to said transverse movements of said member; and means for operatively coupling said member to the engraving machine cutter head to move said carriage and to rotate the work holder through the medium of said member by the lateral movements of the cutter head over the work, and thereby move the work and enable the rotary cutter to reproduce the copy in scaled relation on the circular or semi-circular surface of the work.

9. An attachment for a flat surface engraving machine of the type having a cutter head moved laterally over the work by a stylus tracing flat copy to reproduce the copy on the flat work in scaled relation; said attachment applicable to and removable from said engraving machine as a unit and adapted to cooperate with said machine in reproducing said flat copy in scaled relation on the circular rim of disk like work, said attachment including a normally fixedly located driving spindle for a rotary cutter; a rotary work holder for the disk like work having its surface to be engraved concentric with the holder axis of rotation and with said cutter radial of said surface; a member adapted to be detachably operatively coupled to said engraving machine cutter head to move laterally with said cutter head when following the stylus tracing the flat copy; and mechanism normally holding said work holder against rotation and actuated by said movements of said member and transmitting and translating said movements to said holder in scaled relation to move the same in the direction of said axis of rotation and to rotate said holder to index the work with respect to said cutter in reproducing said copy on said circular work surface.

10. An engraving machine embodying holding means for elongated flat plane copy to be reproduced in scaled relation around the periphery of circular work; pantograph means movable in a normally fixed plane parallel with the plane of said copy and provided with a stylus perpendicular to said planes for tracing the copy and moving said means, said pantograph means provided with a member universally movable laterally by said means in a normally fixed plane; a spindle for carrying the cutter for operating on the work at a normally fixed point; a normally fixed support for said spindle; a longitudinally movable carriage; a work holder adapted to fixedly hold the work and present the surface thereof to said cutter, said holder being carried by and arranged longitudinally of said carriage, said holder being rotatable in said carriage to index the work with respect to said cutter throughout approximately a full circle, and movement transmission mechanism that includes holder indexing means operatively connecting said member with said work holder and with said carriage and actuated by the lateral movements of said member, to index the work holder by independent rotation thereof and to move the carriage with the work holder longitudinally, as the stylus traces the copy.

11. In a machine for reproducing flat elongated copy in scaled relation on and around the circular periphery of disk-like work; in combination, a rotary spindle for driving a rotary cutter for normal operation at a fixed point; a rotary work holder including means to fixedly secure the disk-like work to the holder, said holder provided with a spindle for indexing the work approximately throughout the circle of its periphery by rotating the holder; a gear wheel on said spindle for rotating the same; a reciprocatory carriage in which said spindle is rotatably mounted; a reciprocatory slide mounted in said carriage, said slide relatively movable transversely of said carriage and provided with a longitudinal rack for rotating said gear wheel by longitudinal sliding movement of the slide in the carriage; and means movable laterally in a plane approximately parallel with the plane of said slide and operatively coupled thereto to reciprocate the slide with respect to the carriage to rotate and index said work holder and through the medium of said slide to move said carriage and the holder and work in a direction parallel with said spindle.

12. An attachment for an engraving machine of the type having a member moved laterally in a normally fixed plane by means tracing the copy to be reproduced on the work; said attachment including a support to be removably secured to the engraving machine; carrying and driving means for rotary cutter to operate on the work at a normally fixed point or plane; a work holder adapted to hold disk like work with said cutter arranged radially thereof to reproduce the copy on the periphery of the work and approximately throughout the circle of said periphery as the work is indexed with respect to the cutter, said holder being rotatable on an axis approximately concentric with the periphery of the work to be operated on and being movable back and forth in the direction of said axis; and movement transmitting mechanism between said holder and said laterally movable member to transmit the lateral movements thereof to said holder to move the same axially and to shift the same longitudinally of said axis, said mechanism including a longitudinally movable carriage for and in which said holder is rotatable, and means carried by said carriage to convert certain lateral movements of said member into rotary motion for indexing said work holder and the work.

13. An attachment for an engraving machine of the type having a cutter head universally movable laterally in a normally fixed plane and operated on its lateral movements by a pantograph by means tracing the copy; said attachment embodying means for holding a cutter to normal operation at a fixed point; a rotary and longitudinally shiftable work holder adapted to hold work with its periphery to be engraved in operative relation to said cutter; and mechanism for indexing said holder and the work by rotation of the holder to present the periphery of the work throughout approximately the circle thereof to the cutter and to shift the work back and forth longitudinally, said mechanism being operatively and detachably coupled to said cutter head to be actuated by the universal lateral movements thereof, and including a carriage carrying said work holder longitudinally with respect to the axis thereof, said work holder being independently rotatable in said carriage, and an element adapted to be operatively coupled to and actuated by the cutter head, said element being carried by said carriage to move the same longitudinally and having a relative movement with respect thereto to rotate and thus index the holder.

14. An attachment for an engraving machine of the type having a cutter head universally movable laterally in a normally fixed plane and operated on its lateral movements by a pantograph by means tracing the copy; said attachment embodying means for holding and driving a rotary cutter to normal operation at a fixed point; a rotary and longitudinally shiftable work holder adapted to hold work with its periphery to be engraved in operative relation to said cutter; and mechanism for indexing said holder and the work by rotation of the holder to present the periphery of the work throughout approximately the circle thereof to the cutter and to shift the work back and forth longitudinally, said mechanism being operatively and detachably coupled to said cutter head to be actuated by the universal lateral movements thereof, said mechanism including a movable carriage provided with a relatively rotary mounting for said work holder, and a slide for moving the carriage and holder longitudinally, said slide being relatively movable transversely of the carriage, said mechanism also including means to convert the said relative transverse rectilinear movement of said slide into rotary movement of the work holder in the carriage.

15. An engraving machine including a pantograph movable in a normally fixed plane by the operation of a copy tracing stylus, and a member universally movable laterally by the pantograph in a normally fixed plane; means for supporting a cutter; a work holder adapted to hold peripheral-surface work in operative relation to said cutter, said holder being rotatable to index the work with respect to said cutter and also being movable longitudinally of its axis of rotation; and mechanism operatively coupled to said member and to said work holder for transmitting the universal lateral movements of said member to the work holder to index the same by rotation and to move the same longitudinally of its axis, said mechanism including a carriage in which said holder is rotatably mounted and by which it is carried with the work, the carriage with the holder being movable longitudinally of the holder axis.

16. In combination; a cutter, and mechanisms including a pantograph for causing relative universal lateral movements between said cutter and the circumferential surface of round work while held in operative cutting relationship to reproduce copy in scaled relation longitudinally and circumferentially on said work surface as the pantograph traces said copy, said mechanisms including a work-holder carriage for wholly supporting and carrying the work and embodying means wholly mounted therein for holding and for rotating round work on its longitudinal axis with the circumferential surface of said work in operative cutting relation to said cutter, said carriage confined to a straight line path of movement while wholly carrying said work.

Signed at Racine, Racine County, Wisconsin, this 25th day of January, 1928.

GEORGE HORNER.